(12) United States Patent
Marche

(10) Patent No.: US 8,800,916 B2
(45) Date of Patent: Aug. 12, 2014

(54) DEVICE FOR ATTACHING AN AIRCRAFT ENGINE, COMPRISING BLOCKS FOR CLAMPING AN ENGINE ATTACHMENT WITH A WEDGE EFFECT

(75) Inventor: Hervé Marche, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 25 days.

(21) Appl. No.: 13/461,037

(22) Filed: May 1, 2012

(65) Prior Publication Data

US 2012/0286125 A1 Nov. 15, 2012

(30) Foreign Application Priority Data

May 12, 2011 (FR) ...................................... 11 54129

(51) Int. Cl.
*B64D 27/26* (2006.01)
*B64C 1/16* (2006.01)

(52) U.S. Cl.
USPC .......................................... 244/54; 244/131

(58) Field of Classification Search
USPC ...................... 244/54, 55, 131; 248/554–557; 60/796–797
See application file for complete search history.

(56) References Cited

U.S. PATENT DOCUMENTS

| 2,517,860 | A | * | 8/1950 | Forgy ............................. 244/1 R |
| 3,908,305 | A | * | 9/1975 | Schroeder ........................ 446/50 |
| 4,283,028 | A | * | 8/1981 | Wilke .............................. 244/54 |
| 4,892,435 | A | * | 1/1990 | Anderson ................... 403/374.2 |
| 4,904,109 | A | * | 2/1990 | Anderson ................... 403/374.2 |
| 4,909,659 | A | * | 3/1990 | Anderson ....................... 403/376 |
| 5,257,761 | A | * | 11/1993 | Ratz et al. ................... 244/171.1 |
| 6,474,597 | B1 | * | 11/2002 | Cazenave ......................... 244/54 |
| 2006/0231679 | A1 | * | 10/2006 | Chamberlain .................. 244/54 |
| 2008/0073460 | A1 | * | 3/2008 | Beardsley et al. .............. 244/54 |

FOREIGN PATENT DOCUMENTS

| EP | 1 103 463 A1 | 5/2001 |
| EP | 1 712 466 A1 | 10/2006 |
| EP | 1 852 346 A1 | 11/2007 |
| FR | 2 942 205 A1 | 8/2010 |

OTHER PUBLICATIONS

French Preliminary Search Report issued Dec. 19, 2011 in Patent Application No. 1154129 with English Translation of Category of Cited Documents.

* cited by examiner

*Primary Examiner* — Tien Dinh
*Assistant Examiner* — Steven Hawk
(74) *Attorney, Agent, or Firm* — Oblon, Spivak, McClelland, Maier & Neustadt, L.L.P.

(57) ABSTRACT

A device for mounting an aircraft engine, including a rigid structure, an engine attachment including a connecting plate superposed to an associated connecting plate of said rigid structure, and means for mutually tightening said plates comprising at least one wedge-effect tightening block and corresponding bearing surfaces of said plates which are conformed so that, when each tightening block is applied against said bearing surfaces along a direction parallel to the plane of the contact surface between both of these plates, this block exerts by a wedge-effect a force for tightening these plates against each other along a direction perpendicular to said plane.

9 Claims, 5 Drawing Sheets

DEVICE FOR ATTACHING AN AIRCRAFT ENGINE, COMPRISING BLOCKS FOR CLAMPING AN ENGINE ATTACHMENT WITH A WEDGE EFFECT

TECHNICAL FIELD

The present invention generally relates to a device for mounting an aircraft engine, for example intended to be interposed between an aircraft wing and the relevant engine, as well as to an engine unit comprising such a mounting device.

The invention also relates to a method for fixing an engine attachment to a rigid structure of such an attachment device. It may be used on any type of aircraft equipped with jet turbine engines or turboprops.

This type of mounting device, also called a mounting pylon or "EMS" ("Engine Mounting Structure"), may equally be used for hanging an engine below the wing of the aircraft, for mounting this engine above this same wing, or else further for fixing this engine to the rear portion of the fuselage of the aircraft.

STATE OF THE PRIOR ART

Actually, such a mounting device is usually provided for forming the connection interface between a turbine engine and a wing of the aircraft. It allows transmission to the structure of this aircraft of the forces generated by its associated turbine engine, and also provides the pathway for the fuel, the electric, hydraulic and air systems between the engine and the aircraft.

In order to ensure transmission of the forces, the mounting device includes a rigid structure which is generally of the "box" type, i.e. formed by the assembly of upper and lower spars and of lateral spars or panels connected together via transverse ribs.

On the other hand, the device is provided with attachment means interposed between the turbine engine and the rigid structure, these means generally including two engine attachments, respectively front and rear attachments as well as a device for taking up the thrust forces generated by the turbine engine.

Each of these engine attachments usually includes a plate, called a connecting plate in the following, intended for attaching the engine attachment on the aforementioned rigid structure. This connecting plate generally extends perpendicularly to a middle plane of the rigid structure passing through the axis of the engine. In other words, in the case of a device for mounting an engine hung below the wing of the aircraft, the aforementioned connecting plate extends horizontally when the aircraft is at a standstill.

Further, the rigid structure includes two plates, also called connecting plates in the following, intended for attaching the connecting plates of the aforementioned engine attachments.

FIG. 1 illustrates a portion of a mounting device 10 of a known type, and more particularly shows a connecting plate 12 of the rigid structure 14 of the device as well as a connecting plate 16 of an engine attachment 18 of this device.

As illustrated by this FIG. 1, both superposed connecting plates 12, 16 are centered relatively to each other by means of centering pins 20, also called "spigots", one of which is visible in FIG. 1, and these plates are attached to each other by traction bolts 22, for example four in number. The centering pins 20 allow transmission of forces parallel to the plane P of the contact surface between the plates, while the traction bolts essentially allow the taking up of the forces perpendicular to this plane P.

However, this type of configuration requires the use of relatively bulky and massive traction bolts 22, and requires that a tightening torque of high level be applied to these bolts, which is difficult to apply by a single operator, so that the tightening of these bolts is usually applied jointly by two operators.

Moreover, the traction bolts 22 do not allow sufficient friction between the connecting plates 12, 16 in order to prevent relative sliding of the plates due to the play of the mounting of the aforementioned centering pins. Now, such sliding, symbolically illustrated by the respective arrows 24 and 26 of FIGS. 1 and 2, causes contact wear of the plates, notably during each take-off and landing of the airplane.

Discussion of the Invention

The object of the invention is notably to provide a simple economical and efficient solution to these problems, with which at least part of the aforementioned drawbacks may be avoided.

The invention proposes for this purpose a device for mounting an aircraft engine, including a rigid structure, at least one engine attachment intended for attaching the engine on said rigid structure and including a connecting plate superposed to an associated connecting plate of said rigid structure, as well as mutual tightening means of said respective connecting plates of said engine attachment and of said rigid structure.

According to the invention, said tightening means comprise at least one tightening block with a wedge effect as well as corresponding respective bearing surfaces of said connecting plates which are conformed so that when said tightening block is applied jointly against said bearing surfaces along a direction parallel to the plane of the contact surface between both of these connecting plates, said tightening block exerts through a wedge effect, a force for tightening these plates against each other along a direction perpendicular to said plane.

With the wedge-effect blocks, it is possible to obtain mutual tightening of the respective connecting plates of an engine attachment and of the rigid structure of the mounting device or pylon, and they thereby give the possibility of avoiding resorting to traction bolts of the type used in the prior art.

The invention thereby provides a gain in mass and volume, and further gives the possibility of facilitating the engine attachment mounting operations. Indeed, the mounting of wedge-effect blocks does not require the application of a high tightening torque as this was the case with traction bolts of the prior art.

Further, the wedge-effect enables the tightening blocks to be laid out so as to oppose any relative sliding of the connecting plates on each other.

The invention thereby allows considerable limitation of the risks of contact wear of the aforementioned connecting plates.

It should be noted that the mounting device according to the invention may equally be used for hanging an engine below the wing of the aircraft, for mounting this engine above this same wing, or else further for fixing this engine to the rear portion of the fuselage of the aircraft.

The aforementioned tightening blocks are preferably made in metal, like the respective connecting plates of the engine attachment and of the rigid structure of the mounting device.

In this case, the aforementioned bearing surfaces preferably have an angle of about 10 degrees relatively to the plane of the contact surface between both of these plates.

The mounting device preferably comprises additional means for tensioning each said wedge-effect tightening block.

These tensioning means give the possibility of maintaining each tightening block applied against the aforementioned bearing surfaces of the connecting plates, and therefore guaranteeing the mutual tightening of these plates.

The effect of friction by contact between each tightening block and the corresponding bearing surfaces may contribute to maintaining the block bearing against these surfaces, and may even be sufficient for ensuring such a hold by itself. The additional tensioning means in every case provide additional security against any risk of detachment of both connecting plates.

In a first preferred embodiment of the invention, said means for tensioning each tightening block comprise means for attaching said block to two tightening blocks which are adjacent to it.

In this case, the attachment of the tightening blocks to each other allows these blocks to be maintained applied against the corresponding bearing surfaces of the connecting plates, because of adequate distribution of these blocks along the edge of each connecting plate.

For this purpose, said wedge-effect tightening blocks are preferably conformed so that the whole of these blocks entirely surrounds the edge of each said connecting plate.

Generally, the invention according to this first embodiment in particular has the advantage of not requiring the presence of orifices for letting through tight-fitting screws in the connecting plates, facing each tightening block, which allows optimization of the strength of these connecting plates.

Each tightening block advantageously includes two end plates designed so as to be attached to the corresponding end plates of both adjacent blocks, for example by bolting.

In a second preferred embodiment of the invention, said means for tensioning each wedge-effect tightening block include a tight-fitting screw which is engaged into a tapped means secured to at least one of said connecting plates so as to maintain said tightening block applied against said respective bearing surfaces of said plates.

Each tightening block may thereby be tightened against the corresponding bearing surfaces of the connecting plates, independently of the other tightening blocks.

Further, each tightening block may be of a relatively limited extension along the edge of each connecting plate, and therefore generally be relatively compact and lightweight.

In the second preferred embodiment of the invention, said connecting plates each include preferably at least one through-orifice in which is accommodated a barrel nut into which is engaged said tight-fitting screw and which forms said tapped means.

The barrel nut thus allows retention of the aforementioned tight-fitting screw, and therefore retention of the corresponding tightening block.

Such a nut has advantages well known to one skilled in the art, notably including great ease in controlling the condition of the nut because of the possibility of easily extracting this nut out of its orifice.

In the second preferred embodiment of the invention, said connecting plates advantageously include at least one pair of respective grooves positioned facing each other so as to jointly form a channel for letting through the aforementioned tight-fitting screw, this channel opening out into said through-orifice containing the barrel nut. More precisely, when said barrel nut is in its operating position inside said through orifice, said channel opens out into an inner tapped hole of said barrel nut intended for receiving said tight-fitting screw.

Generally, as said connecting plates have the shape of a quadrilateral, said tightening means advantageously comprise four wedge-effect tightening blocks respectively laid out at the apices of said quadrilateral.

This configuration allows proper distribution of the forces for tightening the connecting plates, induced by the tightening blocks.

Moreover, the mounting device preferably includes a front engine attachment and a rear engine attachment, which are both equipped with tightening blocks of the type described above.

The invention also relates to an engine assembly for an aircraft, comprising an engine as well as a device for mounting this engine, of the type described above.

The invention further relates to an aircraft, comprising at least one engine assembly of the type described above.

Finally, the invention relates to a method for attaching an engine attachment to the rigid structure of a mounting device of the type described above, comprising the tightening of at least one wedge-effect tightening block against respective bearing surfaces of two superposed connecting plates respectively belonging to said engine attachment and to said rigid structure so as to obtain by the wedge-effect, mutual tightening of said plates.

The tightening of each said tightening block with a wedge effect may be obtained in different ways. It may only be due to the friction between the tightening block and the aforementioned bearing surfaces, or preferentially result from the application of means for tensioning the tightening block.

As explained above, such tensioning means may comprise tight-fitting screws, each of which is simultaneously engaged into a corresponding tightening block and into tapped means secured to the connecting plates or, alternatively, means for attaching each tightening block to two blocks which are adjacent to it.

SHORT DESCRIPTION OF THE DRAWINGS

The invention will be better understood, and other details, advantages and features of the latter will become apparent upon reading the following description made as a non-limiting example and with reference to the appended drawings wherein:

FIGS. 1 and 2, already described, are partial schematic longitudinal sectional views of a mounting device of a known type;

In the whole of these figures, identical references may designate identical or like elements.

DETAILED DISCUSSION OF PREFERRED EMBODIMENTS

Figure 3:
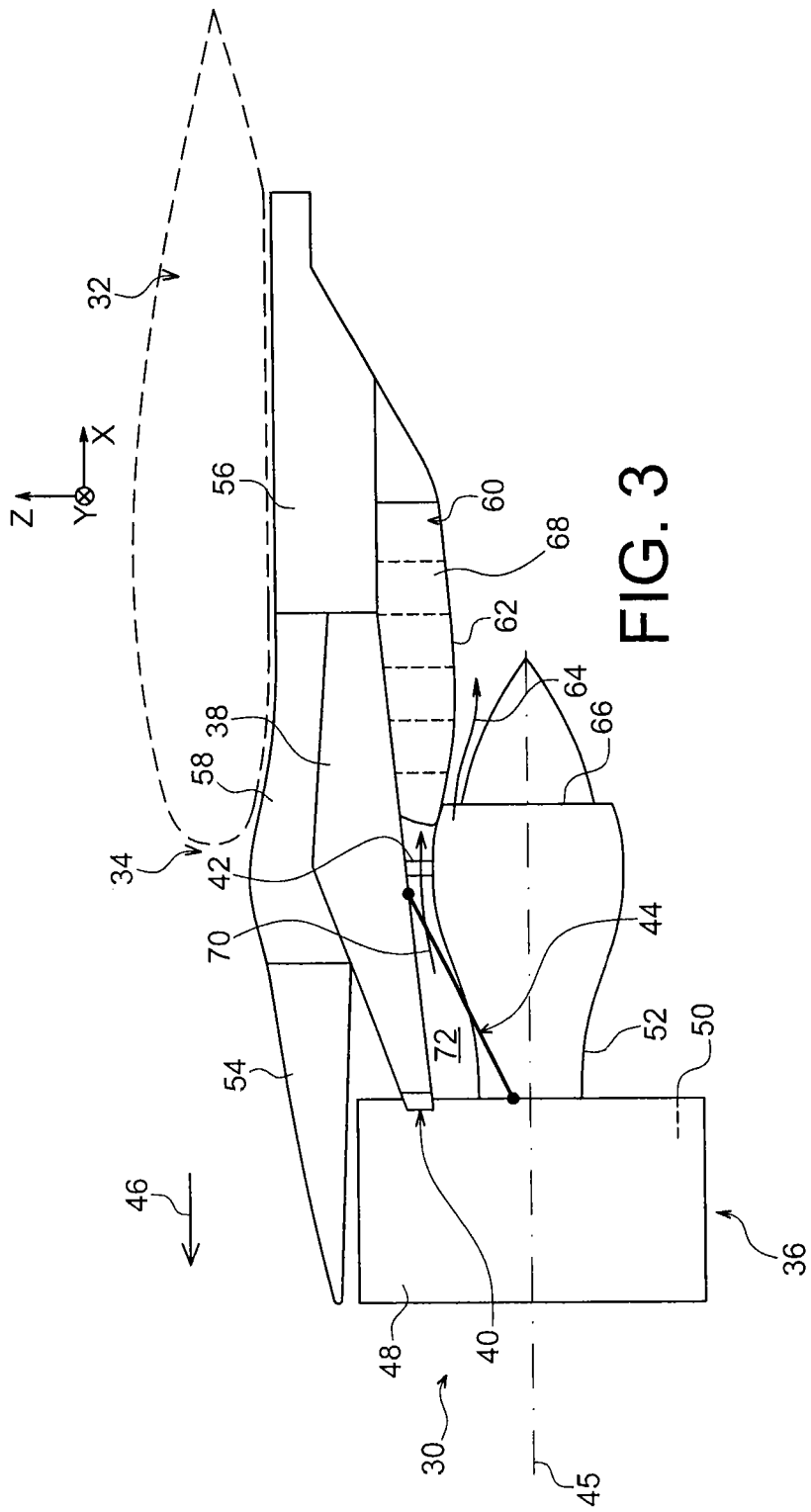
FIG. 3 is a schematic side view of an engine assembly for an aircraft, comprising a mounting device according to a first preferred embodiment of the present invention.

With reference to FIG. 3, an engine assembly 30 for an aircraft is seen, intended to be attached under a wing 32 of this aircraft, this assembly 30 including a mounting device or pylon 34 according to a first preferred embodiment of the present invention, as well as an engine 36, such as a jet turbine engine, attached under this mounting pylon 34.

Globally, the mounting pylon 34 includes a rigid structure 38, also called a primary structure, and means for attaching the engine 36 to this structure 38, these attachment means comprising engine attachments 40, 42 as well as a device 44 for taking up the thrust forces generated by the engine 36.

As an indication, it is noted that the engine assembly 30 is intended to be surrounded by a nacelle (not shown), and the mounting pylon 34 includes another series of attachments (not shown) added onto the rigid structure 38 and enabling the hanging of this assembly 30 under the wing 32 of the aircraft.

In the whole description which follows, the longitudinal direction of the device 34 is conventionally called X, which may also be assimilated to the longitudinal direction of the engine 36, this direction X being parallel to a longitudinal axis 45 of this engine 36. On the other hand, the direction oriented transversely relatively to the mounting device 34 is called Y and may also be assimilated to the transverse direction of the engine 36, and Z being the vertical direction or the height direction, these three directions X, Y and Z being orthogonal to each other.

On the other hand, the terms of "front" and "rear" should be considered relatively to an advance direction of the aircraft, encountered following the thrust exerted by the engine 36, this direction being symbolized by the arrow 46.

In FIG. 3, both engine attachments 40, 42 and the device for taking up the thrust forces 44, the rigid structure 38, as well as a plurality of secondary structures added onto the rigid structure 38, may therefore be seen. These secondary structures ensure segregation and maintaining of the systems while supporting aerodynamic fairing elements and will be described hereafter.

It is indicated that the engine 36 has at the front a fan case 48 of a large size delimiting an annular fan channel 50, and includes rearwards a central case 52 of smaller size, containing the core of this engine. The cases 48 and 52 are of course firmly attached to each other.

In the example described in this FIG. 3, the rigid structure 38 assumes the form of a box extending from the rear to the front, substantially along the X direction. The box 38 then assumes the shape of a pylon with a design similar to that usually observed as regards mounting pylons, notably in the sense that it is provided with transverse ribs (not shown) each assuming the shape of a rectangle oriented in a YZ plane.

As this may be seen in FIG. 3, the engine attachments 40, 42 of the mounting pylon 34 are provided so as to be two in number, and designated as front engine attachment 40 and rear engine attachment 42, respectively.

The front engine attachment 40 is interposed between a front end of the rigid structure 38, also called a pyramid, and an upper portion of the fan case 48.

On the other hand, the rear engine attachment 42 is, as for it, interposed between the rigid structure 38 and the central case 52.

Both of these engine attachments 40 and 42 will be described in more detail in the following.

Still referring to FIG. 3, a front aerodynamic structure 54, a rear aerodynamic structure 56, a fairing 58 for connecting the front and rear aerodynamic structures, and a lower rear aerodynamic fairing 60 are included among the secondary structures of the pylon 34.

Globally these secondary structures are conventional elements identical or similar to those encountered in the prior art, and known to one skilled in the art.

More specifically, the front aerodynamic structure 54 is placed in the lower front extension of the wing 32 and above the rigid structure 38. It is fixedly mounted on this rigid structure 38, and has an aerodynamic profile function between an upper portion of the fan cowls jointed on the latter, and the leading edge of the wing. This front aerodynamic structure 54 not only has a function of aerodynamic fairing, but also allows the setting into place, the segregation and the course of different systems (air, electrical, hydraulic, fuel systems).

Directly in the rear extension of this front structure 54, always under the wing and mounted above the rigid structure 38, is found the connecting fairing 58, also called "karman". Next, always rearwards, the connecting fairing 58 is extended with the rear aerodynamic structure 56, usually called RSS (Rear Secondary Structure), which contains a portion of the equipment of the pylon 34. This structure 56 is preferably located entirely at the rear relatively to the rigid structure 38, and is therefore attached under the wing of the aircraft.

Finally, under the rigid structure 38 and the rear aerodynamic structure 56, is found the lower rear aerodynamic fairing 60, also called a "shield" or "Aft Pylon Fairing". These essential functions are the formation of a heat barrier used for protecting the pylon 34 and the wing 32 from the heat released by the primary flow of the engine 36, and the formation of aerodynamic continuity between the outlet of the engine 36 and the mounting pylon 34.

In a way known to one skilled in the art, the aforementioned fairing 60 includes a heat protection floor 62 provided with an outer surface intended to be followed by a primary flow 64, escaping from the nozzle 66 of the engine, which it partially delimits radially outwards. Moreover, the fairing 60 also includes two side panels 68 which are, as for them, provided so as to be followed exteriorly by a secondary flow 70 of the engine, because of their implantation in the annular channel 72 of the secondary flow of the engine, and/or at the outlet of the latter.

The engine attachments 40, 42 and their attachment to the rigid structure 38 of the mounting pylon 34 will now be described in more detail.

Figure 4:
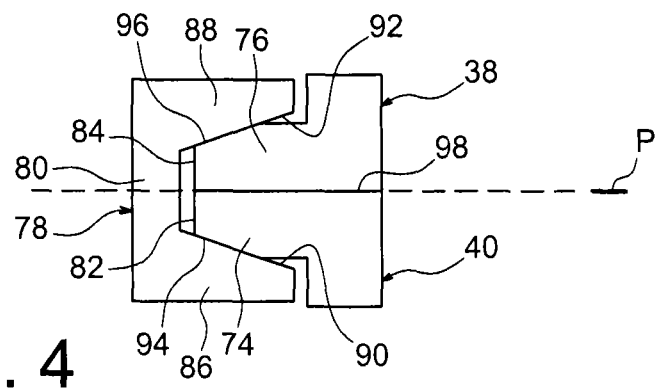
FIG. 4 is a partial schematic longitudinal sectional view of the mounting device of FIG. 3, illustrating the principle of the invention very schematically.

FIG. 4 first of all illustrates the general principle of the invention, according to which, as each engine attachment 40, 42 is provided with a connecting plate 74 superposed to a corresponding connecting plate 76 of the rigid structure 38 of the mounting pylon 34, the aforementioned connecting plates 74, 76 are tightened against each other by means of at least one wedge-effect tightening block 78 which, when it is applied laterally against the connecting plates 74, 76, causes mutual tightening of these plates.

For this purpose the tightening block 78 has a bottom wall 80 globally extending parallel to the respective edges 82, 84 of the connecting plates 74, 76 of the engine attachment 40 and of the rigid structure 38, as well as two tightening jaws 86, 88 extending from the bottom wall 80 towards the connecting plates 74, 76 and having respective tilted bearing surfaces 90, 92 which are applied on respective additional bearing surfaces 94, 96 of the connecting plates, 74, 76 so as to induce tightening of the plates by a wedge effect. It should be noted that the supporting surface 94, 96 of each connecting plate 74, 76 is connected to the edge of the border 82, 84 of the plate which is opposed to the contact surface 98 between both connecting plates 74, 76.

In the example illustrated in FIG. 4, the bearing surfaces 90, 92 of the tightening block 78 form an angle of about 10 degrees with the plane P of the contact surface 98 between the aforementioned connecting plates 74, 76, and are symmetrical relatively to this plane P.

This general principle of the invention will now be described in more detail in the particular case of a front engine attachment 40 of the mounting pylon 34, illustrated in FIGS. 5 and 6, it being understood that this principle may likewise be applied to the rear engine attachment 42.

Figure 5:
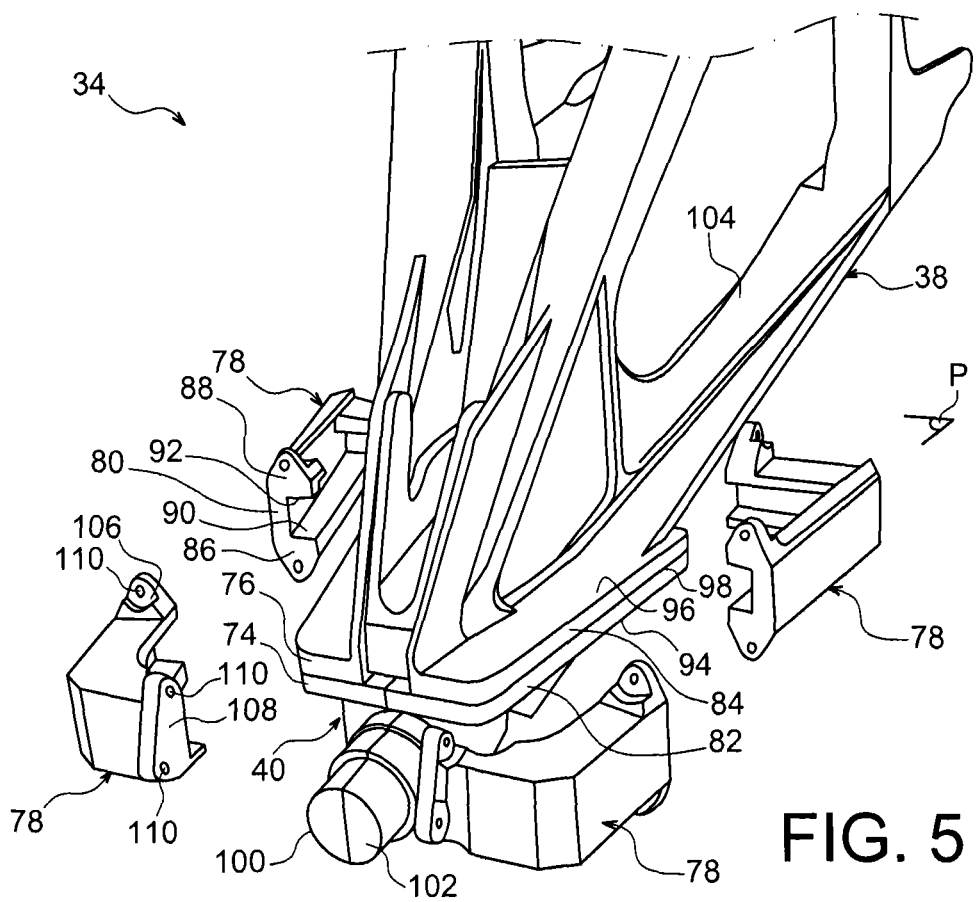
FIG. 5 is a partial schematic perspective view of the mounting device of FIG. 3, showing the wedge-effect tightening blocks before their tightening.

As this appears in FIG. 5, the front engine attachment 40 globally includes means 100 for attachment to the fan case 48 of the engine 36, as well as the connecting plate 74.

The attachment means 100 for example comprise a longitudinal pin 102 intended for taking up the transverse forces conveyed by the engine 36, in a way known per se.

The engine attachment 40 is intended to be fixed onto the connecting plate 76 which is formed at the front end or pyramid of the rigid structure 38 of the mounting pylon 34 and which is secured to spars 104 of this structure, as this will become more clearly apparent in the following.

Each of the connecting plates 74, 76 globally has the shape of a quadrilateral, and more specifically a trapezium. Further, each connecting plate 74, 76 has a tilted supporting surface 94, 96 extending over the whole perimeter of the plate and connected to the edge 82, 84 of the plate.

In order to allow tightening of both connecting plates 74, 76 superposed one against the other, the mounting pylon 34 includes four wedge-effect tightening blocks 78.

As viewed in a section along a plane parallel to the plane P of the contact surface 98 between both connecting plates 74, 76, these four tightening blocks 78 respectively have a conjugate form of the four corners of the assembly formed by both superposed plates 74, 76. In a transverse section, each of the tightening blocks 78 has a conformation like the one of the block 78 of FIG. 4, defining two tightening jaws, 86, 88 having two respective tilted bearing surfaces 90, 92. Further, each tightening block 78 includes two end plates 106, 108 respectively formed at the two opposite ends of the tightening block and intended for fixing said block to both tightening blocks 78 which are adjacent to it, for example by means of bolts. For this purpose, each aforementioned end plate for example includes two orifices 110 for letting through a bolt.

Figure 6:
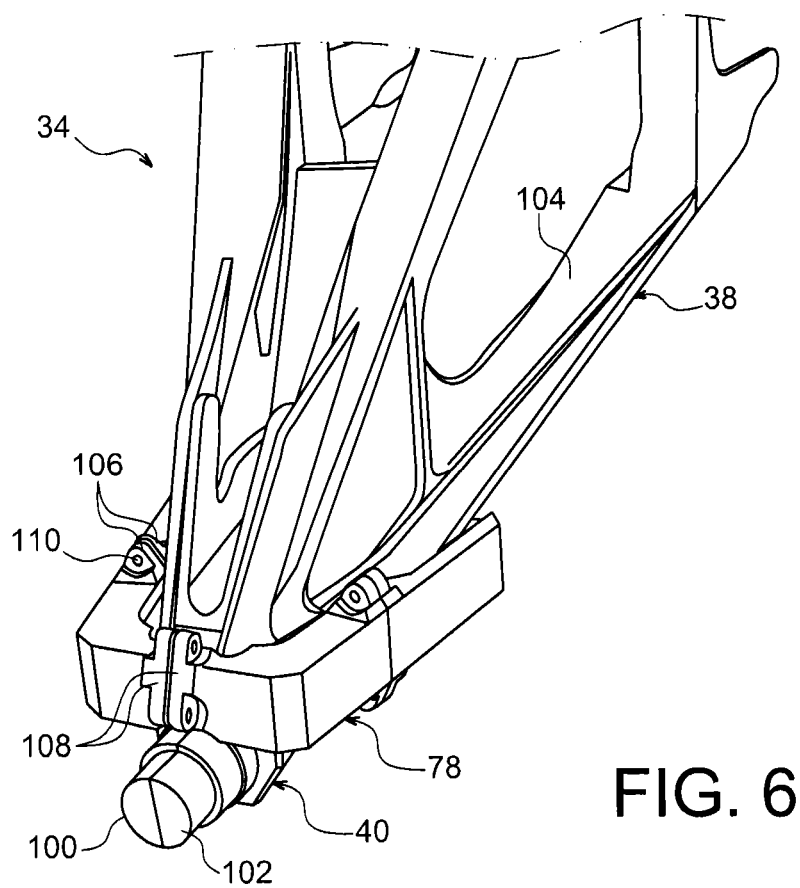
FIG. 6 is a view similar to FIG. 5, showing the wedge-effect tightening blocks after their tightening.

FIG. 6 illustrates the front end of the rigid structure 38 of the mounting pylon 34 with the four wedge-effect tightening blocks 78 in the tightening position, i.e. fixed to each other by their two respective end plates 106, 108, and thereby ensuring mutual tightening by a wedge effect of the respective connecting plates 74, 76 of the front engine attachment 40 and of the rigid structure 38. It clearly appears in this figure that the attachment of the tightening block 78 to each other causes engagement of the connecting plates 74, 76 between both jaws 86, 88 of each tightening block 78 and the tightening of the four tightening blocks 78 on both connecting plates 74, 76.

It should be noted that the end plates 106, 108 of the tightening block 78 and their associated bolts form means for tensioning the tightening blocks 78, in the sense of the terminology of the present invention.

Figure 7:
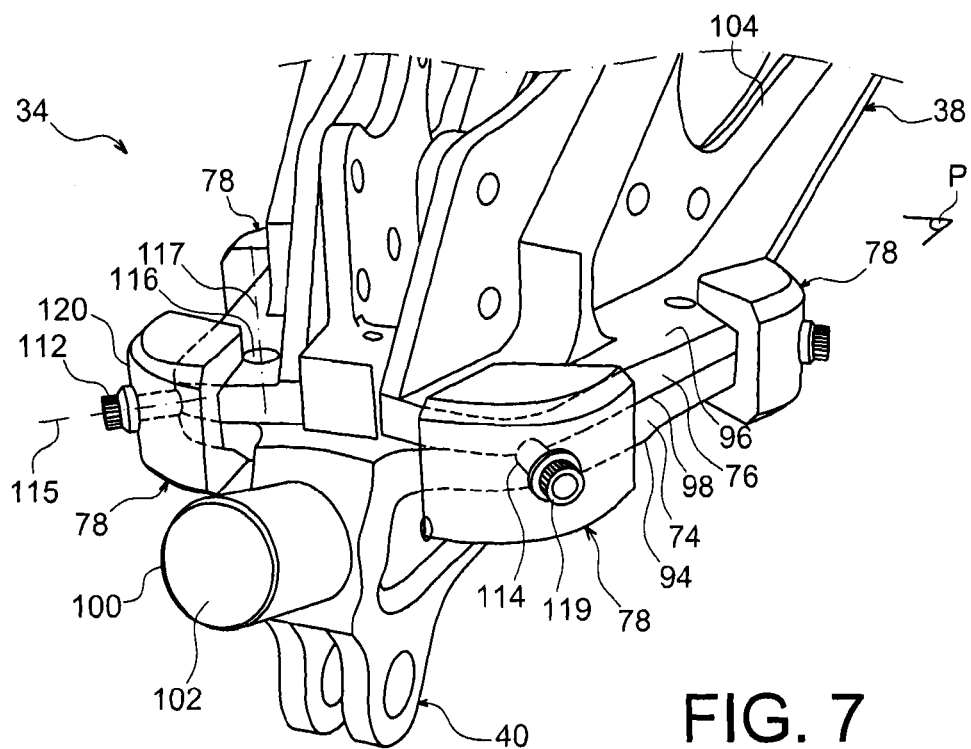
FIG. 7 is a partial schematic perspective view of a mounting device according to a second preferred embodiment of the present invention.

FIG. 7 illustrates a mounting pylon 34 according to a second preferred embodiment of the invention, which differs from the pylon 34 described above by the configuration of the tightening blocks 78 of its engine attachments.

This FIG. 7 more particularly illustrates the front engine attachment 40 attached on the front end, or pyramid of the rigid structure 38 of the mounting pylon 34.

The tightening blocks 78 according to this second embodiment are not fixed to each other and therefore do not include end plates of the type described above.

On the other hand, these tightening blocks comprise tight-fitting screws 112 retained in the assembly formed by both connecting plates 74, 76 so as to guarantee the tensioning of the blocks and therefore mutual tightening of these connecting plates.

More specifically, both connecting plates 74, 76 further have a global shape of a trapezium but having rounded apices. The tightening blocks 78 are therefore applied against tilted bearing surfaces 94, 96 which appear curved when they are observed as a section along the plane P of the contact surface 98 between both aforementioned plates 74, 76. For this purpose, the bearing surfaces 90, 92 of each tightening block 78, which have a shape mating that of the bearing surfaces 94, 96 of the connecting plates, are therefore also curved.

Both connecting plates 74, 76 at each of their rounded apices, have two respective grooves which are formed facing each other so as to define a channel 114 for letting through a tight-fitting screw. The aforementioned plane P is a plane of symmetry for said channel. Said channel opens out into a through-channel 116 with an axis 117 perpendicular to the plane P, which is formed by two respective through-orifices of both connecting plates 74, 76, and in which is accommodated a barrel nut (not visible in FIG. 7). As a reminder, a barrel nut is generally a nut which has a cylindrical outer surface, the axis of which is perpendicular to the axis of the tapped hole which crosses it. In the present case, the axis of the cylindrical surface coincides with the axis 117 of the through-channel 116, and the axis of the tapped hole of the barrel nut coincides with the axis 115 of the channel 114.

Each of the tightening blocks 78 includes a through-orifice with an axis parallel to the aforementioned plane P and coinciding with the axis 115 of a corresponding channel 114 for letting through a tight-fitting screw, in which extends the corresponding tight-fitting screw 112. This tight-fitting screw 112 includes a head 119 bearing against an outer surface 120 of the tightening block 78, and a threaded portion extending into said corresponding channel 114 and engaged into the corresponding barrel nut, so as to tighten the tightening block 78 against the respective tilted bearing surfaces 94, 96 of the connecting plates 74, 76.

Of course, various modifications may be made by one skilled in the art to the mounting pylon 34 described above as a non-limiting example, without departing from the scope of the present invention.

Thus, when the roughness condition of the tilted surfaces 90, 92, 94, 96 for contact between the tightening block 78 and the connecting plate 74, 76 as well as the tilt angle of the surfaces are such that an engagement of the tightening block 78 onto the aforementioned plates is not reversible, i.e. an impact on the tightening block 78 would be required for releasing the latter, the friction observed at these contact surfaces may be sufficient by itself for maintaining the tightening blocks 78 under tension, so that the mounting pylon may then be without any additional means for tensioning the blocks, such as the bolts and attachment plates of the blocks onto each other or the tight-fitting screws described above. However, for safety reasons, it remains preferable to equip the tightening block 78 with additional means for tensioning as described above.

Figure 1:
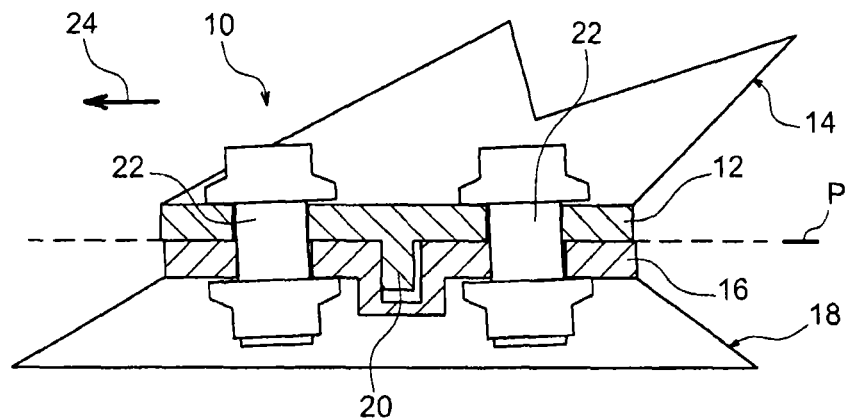
Figure 2:
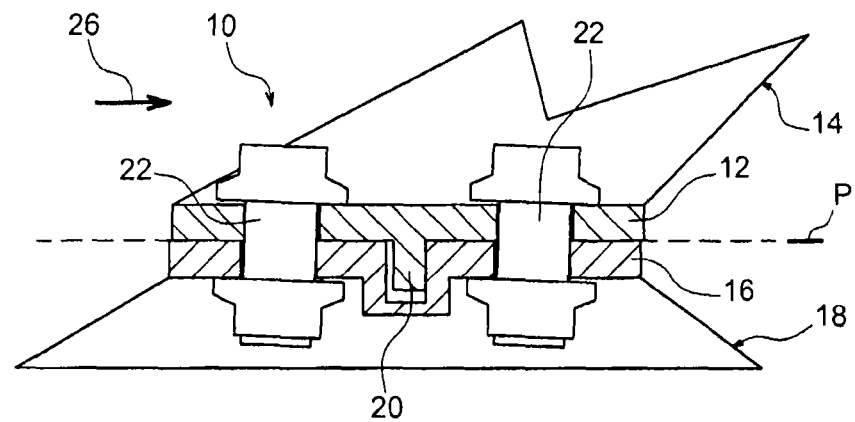

Further, the connecting plates 74, 76 may include centering pins like those described in FIGS. 1 and 2, so as to allow easier mounting of the engine attachment 40 on the rigid structure 38. It should be noted that in this case, these centering pins do not participate in the taking up of forces parallel to the aforementioned plane P like in the devices of the prior art, given that these forces are now taken up by the tightening blocks 78.

The invention claimed is:

1. A device for mounting an aircraft engine, comprising:
   a rigid structure including a first connecting plate;

an engine attachment which attaches the engine on said rigid structure, said engine attachment including a second connecting plate which abuts said first connecting plate of said rigid structure along a contact surface between said connecting plates; and four wedge-effect tightening blocks each including first and second tightening jaws extending towards the connecting plates and presenting tilted bearing surfaces, wherein said first and second connecting plates globally have a shape of a quadrilateral such that said first and second connecting plates together define four corners, wherein each of the first and second connecting plates presents a bearing surface connected to an edge of the respective connecting plate, and the bearing surfaces of the connecting plates are opposite the contact surface of the connecting plates, wherein said tightening blocks respectively have a conjugate shape of said four corners and said tightening blocks are respectively applied at said four corners against said bearing surfaces of said connecting plates along a direction parallel to a plane of said contact surface between said connecting plates such that said tilted bearing surfaces of said tightening jaws contact said bearing surfaces of said connecting plates, such that said tightening blocks exert by a wedge-effect forces for tightening said connecting plates against each other along a direction perpendicular to said plane.

2. The device according to claim 1, further comprising a tensioning device which tensions one of said wedge-effect tightening blocks.

3. The device according to claim 2, wherein said tensioning device includes a fixing unit which fixes said one of said tightening blocks to two wedge-effect tightening blocks which are adjacent to said one of said tightening blocks.

4. The device according to claim 2, wherein said tensioning device includes a tight-fitting screw which is engaged into a tapped device secured to at least one of said first or second connecting plates so as to maintain said one of said tightening blocks applied against said respective bearing surfaces of said first and second connecting plates.

5. The device according to claim 4, wherein said first and second connecting plates each include at least one through-orifice in which is accommodated a barrel nut into which said tight-fitting screw is engaged and which forms said tapped device.

6. An engine assembly for an aircraft, comprising an engine and a device for mounting the engine, wherein said mounting device is a device according to claim 1.

7. An aircraft comprising at least one engine assembly according to claim 6.

8. A method for attaching an engine attachment to the rigid structure of a mounting device according to claim 1, comprising:
   tightening of the wedge-effect tightening blocks against the respective bearing surfaces of both superposed connecting plates respectively belonging to said engine attachment and to said rigid structure so as to obtain by a wedge-effect mutual tightening of said connecting plates.

9. The device according to claim 1, wherein the first connecting plate is formed at a front end of the rigid structure and is secured to spars of the rigid structure.

\* \* \* \* \*